United States Patent [19]
Keller et al.

[11] Patent Number: 6,048,912
[45] Date of Patent: Apr. 11, 2000

[54] RUBBER POLYMERIZATES WITH A HIGH GEL CONTENT AND A HIGH SWELLING DEGREE

[75] Inventors: Dale R. Keller, Monroe Falls; Michael T. Gallagher, Medina, both of Ohio

[73] Assignee: Bayer Corporation, Pittsburgh, Pa.

[21] Appl. No.: 09/126,791

[22] Filed: Jul. 31, 1998

[51] Int. Cl.$^7$ ........................................ C08J 3/28
[52] U.S. Cl. .......................... 522/150; 522/153; 522/157; 522/161; 522/178; 522/182; 522/184; 522/189
[58] Field of Search ...................... 522/150, 163, 522/153, 178, 182, 184, 185, 186, 187, 189, 157, 161

[56] References Cited

U.S. PATENT DOCUMENTS

| | | | |
|---|---|---|---|
| 3,081,244 | 3/1963 | Campanile et al. | 522/178 |
| 3,137,643 | 6/1964 | Bell et al. | 522/184 |
| 3,265,604 | 8/1966 | Harlan et al. | 522/184 |
| 4,412,896 | 11/1983 | Lemattre et al. | 204/159.2 |

OTHER PUBLICATIONS

W. Hoffman, "Rubber Technology Handbook", pp. 403 to 406 (month unavailable) 1989.

"Handbook for Vulcanization and Vulcanization Additives", pp. 359 to 363, (Bayer AG Leverkusen,) (month unavailable) 1965.

*Primary Examiner*—James J. Seidleck
*Assistant Examiner*—Sanza L. McClendon
*Attorney, Agent, or Firm*—Joseph C. Gil; Noland J. Cheung

[57] ABSTRACT

A process for the manufacture of rubber polymerizates comprising the steps of treating said rubber polymerizate with electron beam radiation to adjust the gel content and swelling index of said rubber polymerizate.

11 Claims, No Drawings

RUBBER POLYMERIZATES WITH A HIGH GEL CONTENT AND A HIGH SWELLING DEGREE

FIELD OF THE INVENTION

This invention deals with elastomeric materials comprised of polymerizable monomers that have been altered to provide partial crosslinking (a high gel content with high swell character), the manufacture of the mentioned rubber polymerizates, and their use for the manufacture of molded forms of all types.

BACKGROUND OF THE INVENTION

The low viscosity of many rubber polymerizates, especially of the ethylene vinylacetate or ethylene acrylate type, obtainable from present day production facilities, promote many processing problems during the conversion to finished components which makes their use impracticable for many of these applications. Such problems include sticking to the surfaces of processing equipment, insufficient rigidity during extrusion and low mass/bulk pressure during molding.

During the manufacture of rubber polymerizates, it has been noted that the gel content of such materials was maintained at a very low level in order to preserve a workable safety margin during subsequent processing steps; significantly less than 20% by weight being normal. During vulcanization of the polymerizates, the gel content was strongly enhanced by chemical (usually sulfur based) and/or free radical crosslinking induced by radiation treatment or peroxide cure systems.

For example, the radiation polymerization of elastomers is described in detail by W. Hofmann, "the Rubber Technology Handbook", pages 403 to 406, published in Munich, Vienna, N.Y., 1989. In addition, polymerization with high energy rays is described in "the Handbook for Vulcanization and Vulcanization Additives", pages 359 to 363, (BAYER AG, Leverkusen, 1965). Unfortunately, the polymerizates produced based on the state of the art are frequently very poorly workable in the usual rubber processing equipment.

SUMMARY OF THE INVENTION

The present invention relates to a process for the manufacture of rubber polymerizates comprising the steps of treating said rubber polymerizate with electron beam radiation to adjust the gel content and swelling index of said rubber polymerizate. The present invention also relates to formed article comprising the rubber polymerizate as well as a process for making such a rubber polymerizate.

DETAILED DESCRIPTION OF THE INVENTION

The task of the present invention was to make a rubber polymerizate, which can be processed without difficulty in normal rubber processing equipment. This means that during mixing and subsequent processing of the rubber mixtures, sticking to the mixer blades or mill rolls, profile collapse, and blistering during molding, etc., are prevented. The subjects of the invention at hand are rubber polymerizates based on polymerizable monomers:

With a gel content of 30 to 80%, with reference to the total quantity of polymerizate, and swelling index of 0.3 to 0.7, with reference to the gel.

Polymerizates with partial crosslinking through treatment by electron beam radiation.

Manufactured according to the present invention for molded shapes, extruded profiles, film sheets, and other shaped products of all types.

Gel content and swelling index of the rubber polymerizates based on the invention are determined according to the following method.

The sample is placed in o-dichlorobenzene, to which 1 g/l ionol is added, so that 12.5 g polymer per liter solvent results. The sample is shaken for 6 hours at 140° C., followed by 1 hour at 20,000 revolutions per minute of centrifugation, whereby the temperature is maintained at 140° C. The sol-solution is separated for further analysis. The gel is initially weighed wet after which the dry weight determined by vacuum drying in a chamber until constant weight is attained.

Gel content and the swelling index are calculated based on the following formulas:

Gel content=[mass of dried gel/total weight of sample]×100

Swelling index=[mass of the dried gel/mass of the wet gel]

According to the present invention, the polymerizates should have a gel content of 30 to 80%, with 40 to 70% being preferred for processability. The swelling index should range between 0.4 to 0.6, but extremes of less than 0.3 to greater than 0.7 are possible.

The rubber polymerizates based on the present invention are composed of polymerizable monomers, which can be used individually or in variable mixtures. The most favorable mixing ratio depends on the purpose of the finished product, which is to be produced from the rubber polymerizate, and can easily be determined by appropriate tests. Preferably, the main chain (backbone) of the rubber polymerizate is saturated by $\geq 90\%$, which leads to greater oxidation and ozone resistance of the polymerizate.

Ethylenic unsaturated monomers, dienes, or trienes are considered as polymerizable monomers. The monomers can eventually be substituted, whereby the substitutents can be selected from halogens, especially chlorine, bromine, iodine, eventually substituted alkyl groups, especially methyl, ethyl, n-propyl, iso-propyl, n-butyl, sec-butyl, iso-butyl, tert-butyl, n-pentyl, n-hexyl, eventually substituted alkoxy groups, especially methoxy, ethoxy, n-propoxy, iso-propoxy, n-butoxy, sec-butoxy, tert-butoxy, iso-butoxy, eventually substituted aryl groups, especially phenoxy, p-methylphenoxy, eventually substituted oxycarbonyl groups, especially acetoxy, propionyloxy, butyryloxy, eventually substituted carboxyl groups or esterified carboxyl groups, especially methylcarboxylate, ethylcarboxylate, propylcarboxylate, eventually substituted cyano, sulfonate, vinylester, vinylether and allyl groups. In case the substitutes are again substituted, then these substitutes are preferably substituted with $C_1$–$C_{20}$-groups or halogens.

Particularly preferred monomers are ethylene, propylene, 1-butene, 2-butene, 1-pentene, chloroethylene, styrene, methylacrylate, methylmethacrylate, ethylmethacrylate, methacrylic acid, vinylacetate, methylvinylether, ethylvinylether, cyanacrylate, butadiene, isoprene, chloroprene and ethinyl norbornene.

Most particularly preferred are rubber polymerizates, which are composed of ethylene and vinylacetate, of ethylene, and the above mentioned acrylates and of pure above mentioned acrylates.

With the above mentioned polymerizates, the mixing ratio of the monomers to each other, in other words, the ratio in which the monomers are reacted together to form the polymer or polymerizate, is generally 0.1% to 99.9%, preferably 5% to 95%, and most preferably, 30% to 80% For example, for a ethylene-vinyl acetate polymer (EVM), if ethylene is present in an amount of 40 to 80%, then vinyl acetate is present in an amount of 60 to 20%.

Preferably, the gel content and the swelling degree of the rubber polymerizate based on the present invention are adjusted by ionizing radiation. The preferred ionizing radiation source is electron beam.

In order to be able to adjust the gel content and swelling degree of the rubber polymerizate based on the present invention, treatment with ionizing radiation is carried out with an electron beam radiation dosage of 5 to 75, preferably 5 to 45, most preferred 10 to 40 kGy (kilo Gray). The S.I. unit of energy is the Gray which is defined as the absorption of 1 Joule of energy per Kilogram of material. Irradiation can be carried out with any suitable equipment, for example, with a Dynamitron manufactured by Radiation Dynamics, Inc. Treatment with ionizing radiation can be carried out in usual ways at temperatures of 0° to 130° C. It is quite practical to treat with electron beam radiation at or near room temperature. In the present invention, sufficient temperature is needed to provide reasonable radical mobility to guarantee an adequate crosslinking proficiency.

The preferred process is based on converting the monomers into polymerizates using normal procedures current to existing production processes followed by treatment of the finished polymerizates with ionizing radiation. Treatment of these finished products involves exposing varied forms from powder to slabs to the radiation source. The key parameter being that the applied ionized radiation completely penetrates the polymerizates exposed.

To insure that the gel content is evenly distributed in the finished packaged product, post treatment blending has proven to be advantageous. As an example, in cases where the rubber polymerizate is present in finely divided form, a powder mixer can be used for homogenizing. Through this homogenization process, it is possible to obtain a uniform product with regard to the gel content independent of the shape and size of the irradiated sample or container.

If the electron beam treatment should exceed the average desired gel content, it may be adjusted downward by blending with non-radiated product.

The irradiated rubber polymerizates can be mixed with customary additives and processing aids in known quantities for the manufacture of formed articles, as described for example, in the Encyclopedia of Polymer Science and Engineering, Vol. 4, page 66 forward (Compounding) and Vol., 17, page 666 forward (Vulcanization). Carbon black, mineral fillers, metal oxides, oils, fatty acids, organic peroxides or other crosslinking agents, softeners, anti-stick agents, separation agents, antistatics, flame retardants, and preservatives are cited as possible additives and manufacturing aids.

Further, it is possible to mix the enhanced gel polymerizates derived from the invention with other polymers during the mixing or compounding operation in order to alter the finished component characteristics of the formed article to be manufactured. Acrylate rubber (ACM), polybutadiene (BR), polychloroprene (CR), chlorinated and chlorosulfonated polyethylene (CM, CSM), polyvinylchloride (PVC), ethylene-propylene rubber (EPM), ethylene-propylene-diene-rubber (EPDM), ethylene-vinylacetate rubber (EVM), polyisoprene (IR, NR), acrylonitrile-butadiene rubber (NBR), hydrated acrylonitrile-butadiene rubber (HNBR), styrene-butadiene rubber (SBR), ethylene-methyl(meth) acrylate rubber, especially ethylene-vinylacetate rubber, ethylene-methyl(meth)acrylate rubber and acrylate rubber are polymerizate samples mentioned.

For example, ethylene-vinylacetate rubber is sold under the label Levapren® by Bayer AG on the market, ethylene-acrylate rubber as VAMAC® from DuPont or DuPont Dow elastomers.

The polymerizates can be added individually, or also added as mixtures of each other to the rubber polymerizates based on the present invention. The mixing ratio of the rubber polymerizates to the added polymerizates is thereby in the range of 0.1–99.9:99.90–0.1%. Blends of polymers such as EVM/HNBR can be made during compounding to enhance properties or to adjust cost. The most favorable mixing ratios can easily be determined by preliminary tests and depend upon the intended application of the mixtures.

The manufacture of the formed articles using the rubber polymerizates based on the invention can be carried out using the traditional equipment of the rubber-processing industry; banbury mixers, extruders, calendars, and injection molding machines The rubber polymerizates based on the invention exhibit an increased filling capacity, in addition to a good manufacturing capability. In addition, the polymerizates with larger amounts of softeners can be compounded, which increases flexibility in cold temperatures.

An additional, important advantage of the rubber polymerizate based on the invention is the clear improvement in the pourability, which is unalterable for the continuous manufacturing. Especially Levapren®, which is non-irradiated, is only pourable for a short time due to its rich stickiness. This disadvantage is eliminated by irradiation based on the invention.

The following examples serve to clarify the invention.

EXAMPLES

Levapren® is a co-polymerizate of ethylene and vinylacetate, and is a registered trademark of Bayer AG.

Levapren® 400 has a content of 40% vinylacetate.

Rhenogran® P50 is a hydrolized preservative manufactured by Rhein Chemie Rheinau GmbH.

Aktiplast® PP is a processing promoter obtainable from Rhein Chemie Rheinau GmbH.

TAIC-50 (2) is a polymerization activator obtainable from Rhein Chemie Rheinau GmbH.

The Mooney values stated in the examples were measured with a Monsanto Rheometer ODR R-100, the gel content and the swelling indices were determined using the above mentioned method.

Example 1

Levapren® 400, with a Mooney viscosity (ML 1+4) of 20 MU and a gel content of under 1% was irradiated with 35 kGy of E-beam radiation based on the process mentioned above. The measurements indicated a Mooney viscosity (ML 1+4) of 60 MU, a gel content of 61%, and a swelling index of 0.4.

Example 2 (Comparison)

Levapren® 400, with a Mooney viscosity (ML 1+4) of 20 MU and a gel content of under 1% was irradiated with 65 kGy of E-beam radiation based on the above mentioned process. The measurements indicated a Mooney viscosity of more than 100 ME, a gel content of 82%, and a swelling index of 0.82.

Manufacturing of the Mixture

The usual mixture was used. The mixture components were mixed in a laboratory inner mixer using conventional methods (See, Encyclopedia of Polymer Science and Engineering, Vol. 4, page 66 forward).

Rhenogran® and Aktiplast® are registered trademarks of Rhein Chemie Rheinau GmbH.

From the product according to Example 2, a mixture was produced which was not processable.

TABLE 1

|  | Unpolymerized Base Material | Polymerized Material from Example 1 |
|---|---|---|
| Levapren ® 400 | 100 | — |
| Levapren ® 400 irradiated | — | 100 |
| Rhenogran ® P50 | 3 | 3 |
| MT (N990) carbon black | 40 | 40 |
| Disflamoll TKP (1) (softener) | 15 | 15 |
| Polyethylene AC-617 | 2 | 2 |
| Zinc borate | 5 | 5 |
| Stearic acid | 1 | 1 |
| Aktiplast ® PP | 2 | 2 |
| TAIC-50(2) | 3 | 3 |
| Peroxide (3) | 5 | 5 |
| Total: | 176 | 176 |

(1) Obtainable from the Bayer Corporation
(2) Obtainable from Rhein Chemie
(3) Obtainable as D-Cup 40C; Harwick

| Mixing Characteristics | | | |
|---|---|---|---|
| Density | (g/cm$^3$) | 1.152 | 1.152 |
| ML 1 + 4/100° C. | MU | 11 | 25 |
| Ms-t5/125° C. | (min) | 29 | 13 |
| A Monsanto-ODR, R-100 was used as a testing apparatus, oscillating Die Rheometer, for measuring the cure profiles of the compound at 177° C. | | | |
| ML | (dN.m) | 1.2 | 4.0 |
| MH | (dN.m) | 31.5 | 37.8 |
| T 2 | (min) | 1.5 | 1.4 |
| T 50 | (min) | 3.0 | 2.8 |
| T 90 | (min) | 6.2 | 5.8 |

| Vulcanizate Properties: Vulcanization in the press: (10 min/177° C.) | | | |
|---|---|---|---|
| Molding improvement: | 1 = Good | 5 | 2 |
| Quality of parts | 5 = Poor | | |

Example 1 shows the treatment based on the inventions of an EVM rubber, in Example 2, too high of a radiation dosage was selected.

Table 1 shows an improvement in the quality of the molded part because of the higher viscosity resulting from irradiation of the polymer. The rating shown indicates improved surface esthetics, along with a significant reduction of blistering attributed of better displacement of air during the molding operation.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the manufacture of a formed article comprising the steps of:

a) converting at least one polymerizable monomer into a saturated rubber polymerizate;

b) adjusting the gel content and swelling index of said rubber polymerizate with electron beam radiation such that said rubber polymerizate has a gel content of 30 to 80% with reference to the total mass of said rubber polymerizate and a swelling index ranging from about 0.3 to 0.7.

2. A formed article comprising a saturated rubber polymerizate, wherein the gel content and swelling index of said rubber polymerizate is adjusted with electron beam radiation such that said rubber polymerizate has a gel content of 30 to 80% with reference to the total mass of said rubber polymerizate and a swelling index ranging from about 0.3 to 0.7 and wherein said rubber polymerizate comprises at least one polymerizable monomer.

3. A process according to claim 1, wherein said polymerizable monomer is selected from the group consisting of ethylene and vinylacetate; ethylene and acrylate; or acrylate.

4. A process according to claim 1, wherein said treatment with electron beam radiation is carried out with a radiation dosage in the range of 5 to 75 kGy.

5. A process according to claim 4, wherein said radiation dosage is in the range of 10 to 40 kGy.

6. The formed article according to claim 2, wherein said rubber polymerizate comprises polymerizable monomers selected from the group consisting of ethylene and vinylacetate; ethylene and acrylate; or acrylate.

7. The formed article according to claim 2 wherein treatment with ionizing radiation is carried out with a radiation dosage in the range of 5 to 75 kGy.

8. The formed article according to claim 7 wherein treatment with ionizing radiation is carried out with a radiation dosage in the range of 10 to 40 kGy.

9. The formed article according to claim 2, wherein said formed article is a molded shape.

10. The formed article according to claim 2, wherein said formed article is an extruded article.

11. The formed article according to claim 2, wherein said formed article is a film sheet.

* * * * *